(12) United States Patent
Theuer et al.

(10) Patent No.: US 6,408,903 B1
(45) Date of Patent: Jun. 25, 2002

(54) FUEL TANK INTAKE ASSEMBLY

(75) Inventors: Thomas Theuer; Thomas Conrad, both of Treuchtlingen; Christian Sünkel, Michelau; Kugler Clemens, Dittenheim, all of (DE)

(73) Assignee: Alfmeier Prazision AG, Baugruppen und Systemlosungen, Treuchtlingen (DE)

( * ) Notice: Subject to any disclaimer, the term of this patent is extended or adjusted under 35 U.S.C. 154(b) by 5 days.

(21) Appl. No.: 09/706,457

(22) Filed: Nov. 3, 2000

(30) Foreign Application Priority Data

Nov. 4, 1999 (DE) .......................... 199 54 110

(51) Int. Cl.[7] .............................. B65B 1/04; B65B 3/00; B67C 3/00
(52) U.S. Cl. ........................ 141/348; 141/312; 141/301; 141/369; 141/372; 220/86.2; 220/254; 220/DIG. 33
(58) Field of Search ................................ 141/312, 348, 141/349, 350, 369, 370, 384, 301, 304, 372; 220/86.2, DIG. 33, 254

(56) References Cited

U.S. PATENT DOCUMENTS

| | | |
|---|---|---|
| 3,133,741 A * | 5/1964 | Garabello ...................... 280/5 |
| 3,750,825 A | 8/1973 | Bachle |
| 4,376,492 A | 3/1983 | Bartel et al. |
| 4,418,553 A | 12/1983 | Applegate |
| 4,795,050 A | 1/1989 | Smith et al. |
| 5,072,982 A | 12/1991 | Boss |
| 5,145,081 A * | 9/1992 | Gavino ...................... 220/86.2 |
| 5,234,122 A | 8/1993 | Cherng |
| 5,253,920 A | 10/1993 | Eldridge |
| 5,437,317 A | 8/1995 | Takatsuka et al. |
| 5,524,786 A | 6/1996 | Skudlarek |
| 5,615,793 A | 4/1997 | Muller |
| 5,715,963 A * | 2/1998 | Boll et al. .................. 220/86.2 |
| 5,845,800 A | 12/1998 | Shaw et al. |
| 5,988,238 A * | 11/1999 | Palvolgyi .................... 141/312 |

OTHER PUBLICATIONS

Derwent DIALOG Abstract for DE 19802592, Jul. 29, 1999.
German Patent No. 19832910, Jan. 28, 1999.
U.S. Patent Serial No. 09/121,223, entitled "Closure Apparatus for Motor Vehicle Fuel Tanks" (English version of DE 19832910), Jul. 23, 1998.

* cited by examiner

Primary Examiner—Timothy L. Maust
(74) Attorney, Agent, or Firm—Dority & Manning, P.A.

(57) ABSTRACT

A fuel intake assembly for a vehicle fuel tank is provided. The fuel intake assembly has a closure flap which opens and closes the intake opening. A sealing element and a seat on one or another of the closure flap and the fuel intake fitting cooperate to seal the fuel intake in a closed position. An apparatus is affixed to the closure flap which seals and locks the closure flap to the fuel intake fitting to prevent unwanted opening of the fuel tank.

31 Claims, 9 Drawing Sheets

FUEL TANK INTAKE ASSEMBLY

BACKGROUND OF THE INVENTION

Intake fittings for the fuel tanks of motor vehicles are, as a rule, closed with a tank cap. To fill the tank with fuel, the tank cap must be opened. When this is done, the soiling of the hands, especially with diesel fuel, is not always to be avoided. In order to prevent such soiling and generally to increase tank friendliness, intake fittings have been proposed which possess no screw-on or clip-on tank caps but exhibit a locking cap, which, when impelled by a penetrating fuel hose nozzle, swings inward against the action of a spring. In its closed position, the closure flap lies on a sealed seat.

In order to prevent an unwarranted opening of the closure flap, DE 198 02 592 disclosed an intake fitting provided with a locking arrangement of the closure flap. In this arrangement, the closure flap is provided on its inner side with a catch having a reach-through opening. By means of a radial boring in the intake fitting, a locking pin passes through to the inside, there engaging in a recess of the catch. Thus, the closure cap is locked in its closed position. The disadvantage of this is that additional sealing means are necessary.

In the conventional intake fittings, the sidewall of the fitting possesses an opening from an axle boring. Between the outer wall of the intake fitting and this entry is a sealing ring to prevent the escape of fuel vapors. In the interior of the intake fitting, between the forward end of the axle, which forms the locking bolt and an inwardly extending section thereof, the installation of a sealing ring has been arranged. In spite of this complex and expensive sealing measure, an escape of fuel vapor is still not entirely prevented.

OBJECTIVES AND SUMMARY OF THE INVENTION

Thus, an objective of the invention is to propose an intake fitting with a closure flap with improvements to prevent the escape of fuel vapor.

The object is achieved by an intake fitting possessing the features of the invention. In accord with this, there has been provided a locking mechanism on the outer side of the closure flap which, in the closed position, stands in contact with the ambient atmosphere. Because of this construction, the locking mechanism is accessible from the outside so that a penetration through the intake fitting, as taught by DE 198 02 592 with its attendant disadvantages, especially in regard to the escape of fuel vapors, is no longer necessary. The locking mechanism, which, for example, can be installed in a conventional intake fitting, prevents an unauthorized opening without increasing the escape of fuel vapors.

In a preferred embodiment, there is at least one locking element installed on the closure flap, whereby the flap is hingedly movable between a position of full closure and a free opening. In the locked position, the concept is that an apparatus arrests the closure flap in a closed position; i.e., a co-action is in effect between a detent engaging an arresting means in the direction of the longitudinal centerline axis of a seat for a sealing element. The longitudinal centerline axis of the sealing element is, of course, also the centerline axis of the intake fitting. With this embodiment, of course, the essential elements of the closure flap locking mechanism are already in place, so that limitations of design measures in the adjacent bodywork are minimized. Essentially, a body-side initiation for the activation of the locking mechanism is provided, wherein this activation drive can be supplied by very simple measures, i.e., in the form of a Bowden cable or the like.

Advantageously, a spring element is provided, which loads the locking mechanism in essentially an axial direction when the locking mechanism is in the locked position. Accordingly, the closure flap is pressed against the seat of the sealing element and pressure increases the impermeability at that location. Tolerance variations in manufacture are compensated for by the spring. Advantageously, the rim which circumferentially surrounds the opening of the intake fitting also serves as the detent for the opening. This design is particularly advantageous in consideration of the expense of manufacture. In this way, the installation, or the molding on, of additional abutting detents can be dispensed with.

The spring element, in the case of a particularly favored embodiment, is designed as an annular spring circumferentially placed about the rim of the opening and compressible in an axial direction. An annular spring of this design permits, in a relatively simple way, its affixation on the opening rim in both radial and axial directions. Furthermore, the annular spring can be so constructed that it exercises the same spring force at each point of its circumference on a co-acting locking mechanism.

In an advantageous embodiment, on the end of the annular spring which leads its motion, an axial movable slider ring is installed. The side of this slider ring, which is remote from the spring, is spring loaded in the locking position of the locking mechanism. Advantageously, an annular spring, somewhat of the order of a circumferentially, accordion pleated, leaf spring can be employed, which would also exhibit a pre-domed section in its axial direction. By means of the slide ring, first, a circumferential distribution of the spring force is assured, and second, the uniform co-action with a locking element at a practically optional point on the circumference can be effected.

In the case of a further, preferred embodiment, two locking elements are provided, which are constructed as pivoting arm locking components. These locking elements can be pivoted within a pivot plane somewhat parallel to and at an axial distance from the extended plane of the opening rim. In a case with two annular springs, a symmetrical compression becomes possible if the pivoting arms engage the opening rim with their outer lying locking ends, that is, the slider ring, at diametrically oppositely disposed points. In doing this, it is advantageous if the inner lying ends of the pivoting arms overlap and are penetratively joined by a common axle in the center of the closure flap in such a way that they are thus coaxial with the pivoting axle, which in turn is coaxial to the center axis of the intake fitting.

In order to make the opening of the closure flap possible, it is necessary that the pivoting arms, in their released position, be so positioned on the outside of the closure flap that this flap can unobstructedly be swung inwardly into the intake fitting by the fuel hose nozzle. This advantage is achieved by the fact that the pivoting axle is movable in a continuous radial direction, symmetrical to the pivoting arms. Thus, the movement of the pivot axle is coupled with the movement of pivoting arms. If the pivoting axle starting from the locked condition moves radially outward, somewhat through a body side activation element, then at the same time the pivot arms are swung inward, they become positioned centrally on the outside of the closure flap in such a manner that their respective opening movements are not obstructed. The radial movement of the pivoting axle and the pivoting of the pivot arms are preferably realized in that the former with at least one end engages in a radially running guide groove. The latter with respectively one control pin engages into a control groove in the plane of the guide groove, which runs at an angle to the plane. These grooves are in this arrangement so positioned that they enclose between them an angle opening toward the center axis.

In an advantageous positioning of the pivoting arms, from the point of view of manufacturing technology, these arms are between two bearing plates running parallel to the pivoting plane of the arms. In the inner surfaces of the bearing plates are, respectively, one guide groove and two control grooves. During the assembly, the parts can simply be set, one into the other, wherein the pivoting axle has its ends engaged in the guide grooves and the pivoting arms have their control pins running in the control grooves.

Additional measures for affixing are necessary. The components protruding out of the bearing plates and out of the pivot arms permit, in a simple manner, a fastening on the outside of the closure flap. A further advantage is found in that the pivoting arms are protected from damage by the fuel hose nozzle by the bearing plates which were installed outside of and above said arms. An advantageous possibility of affixing the components on the closure flap can be found therein in that on the edge of the upper bearing plate, as seen in the assembled condition, an apron is formed which encompasses the pivoting arms. The free ends of the arms, in this case, are respectively fixed on the closure flap outer side.

The apron exhibits two window-like openings through which the pivoting arms in the closed position pass. The apron offers a lateral mechanical protective barrier, which diminishes the danger that in an accident the locking mechanism of the closure flap will open. The same purpose is served by the arrest device of the pivoting arms at their end positions. If, for instance, in an accident, the locking mechanism, i.e., the pivoting arms, are separated from their drive, then the arrest device prevents a situation in which the arms can, without any restrictions, immediately move into their released position. Advantageously, this arrest condition is achieved by a bar spring, which is located in an interposed space between the lower bearing plate and the closure flap outside. The bar spring with a V-shaped longitudinal section, engages itself in the movement path of the guide groove of the lower bearing plate in which the penetrating pivot axle runs.

For the activation of the pivoting arms, there are several possibilities available. It is somewhat worthy of consideration that activation elements could be placed on the free ends of the pivoting arms. In the case of a preferred embodiment, however, two opposed hooks are placed on the outer sides of the inner ends of the said pivoting arms, which overlap each other in an axial and radial direction. To effect the movement of the pivoting arms, there is provided a radially extending activation rod, which, with its own hook arrangement on the end, engages the aforesaid hooks. In order to make possible an opening of the closure flap, when the pivoting arms are in their release position, it is necessary that the activation rod be separated from the hooks. Advantageously, such a separation is attained in that the hooks possess such a length that in the release position of the pivot arms, they no longer overlap. In this situation, the free ends of the hooks are distanced, one from the other, to such an extent that they are found outside of the movement path of the end sections of the activation rod. These hooks can now be separated from the pivot arms and moved radially outward until they are in a radial position beyond the swinging zone of the closure flap. Further, the activation rods can also be moved radially to the extent that they avoid being damaged upon the insertion of the fuel hose nozzle.

As mentioned, in the case of an accident, means must be provided to prevent the release of the locking mechanism of the closure flap. By means of a tube-shaped protective sheath affixed to the intake fitting and circumferentially surrounding the locking mechanism, the inferred danger is essentially reduced, especially when the protective sheath is made of metal and is welded to a metal intake fitting.

Besides an increased crash safety feature, this construction has the additional advantage in that the permeation value can be further depressed, since metal is absolutely impermeable for fuel vapors. Still within this concept, it can be further advantageous to make the filling tube, which is affixed to the intake fitting, of metal. In the case of accident-caused deformation of the vehicle in the area of the intake fitting, consideration should be given to the fact that the activation rod can be similarly deformed so that it unlocks the closure flap. In order to prevent this, a break-away section is provided in the activation rod.

In order to ease the insertion of the fuel hose nozzle into the filling opening and to avoid damage to the sealing zone of the intake fitting by a catching of the nozzle, in the case of a preferred embodiment, an intake funnel is provided. The intake funnel, together with the intake fitting on the tank, can be closed by an existing sealing element which is on the inside of a closure flap to seal off the tank.

In order to avoid an elevated pressure within the tank that makes the opening of the closure flap difficult, or even completely prevents such opening, an apparatus co-acting directly or indirectly with the outside of the closure flap has been provided. With this apparatus the closure flap is movable in a small space between its sealing element and the seat thereof in a free interposed position. An internal tank pressure can relieve itself through this opening. Beyond this, in this interposed position of the closure flap, during the withdrawal of the fuel hose nozzle from the intake fitting, after a completed tank filling operation, drainage drippings of the fuel can flow into the tank.

BRIEF DESCRIPTION OF THE DRAWINGS

The invention will now be explained in greater detail with the aid of the incorporated drawings. There is shown in.

DETAILED DESCRIPTION OF THE DRAWINGS

Reference will now be made in detail to the presently preferred embodiment of the present invention, examples of which are illustrated in the drawings. The examples are provided by way of explanation of the invention and are not meant as limitations of the invention. For example, features illustrated or described as part of one embodiment can be used on another embodiment to yield yet a third embodiment. Accordingly, it is intended that the present invention include such modifications and variations.

In FIGS. 1–5, a tubular section shaped intake fitting 1 is presented, the lower end 2 of which (FIG. 1) can be connected with the filling pipe of a fuel tank (the latter not shown). A filling opening 4 is depicted near a locking mechanism 34 opposite the lower end 2. The filling opening 4 is circumferentially bounded by opening rim 3. The free end of the radially, inwardly extending opening edge is bordered around by the formation of a somewhat U-shaped fold, whereby a seat 5 is made for a sealing element 23. The radial, inward positioned section of the fold extends outward with projection 6 above the plane surface 7 of the opening rim 3. In the end section of the intake fitting 1, which carries the filling opening 4, a tube section 8 is fitted in, which lies at least partially with its circumference on the inner wall of the intake fitting 1. This section 8 serves, among other duties, as a carrier for the closure flap 18 as will be explained below. The upper end of the section 8 is bent radially inward and lies on the underside of the section of the opening rim 3, which runs between the sealing element seat 5 and the outer wall of the opening rim 3.

On the plane surface 7 is placed an annular spring 9, which is constructed in the form of a leaf spring, which possesses, in the direction of the center axis 10 of the sealing element seat 5, a projecting, wave-shaped circumferential section 12. Superimposed above the opening rim 3 and coaxially with the annular spring 9, lies a slide ring 13, whereby this stands in contact with the axially projecting circumferential section 12. The slide ring 13 possesses on its inner side, an axial, detent shoulder 14 exposed downward, which coacts with the circumferential section 12 of the annular spring 9 as a counter abutment. The result of this is that the slide ring 13 is fixed in its radial disposition. The annular spring 9 itself is radially affixed by the excess height 6 of the opening rim 3. The affixing of annular spring 9 and the slide ring 13 in their axial positions is done by a radially extending, inward projecting web piece 15.

The web 15 is stamped out of an essentially tube shaped protective sheath 16, which lies with its inner surface on the outer circumferential surface of the upper end of the intake fitting 1, and with the aid of a welding operation, is so fixed in position. The protective sheath 16, with the radially, inwardly extending detent web stamped out of its wall, supports itself on the plane surface 7 of the opening rim 3. The protective sheath 16 exceeds in height the intake opening 4 with a longitudinal section 17 extending itself inward at a steep angle. It is out of this section that the web 15 was stamped.

Figure 9:
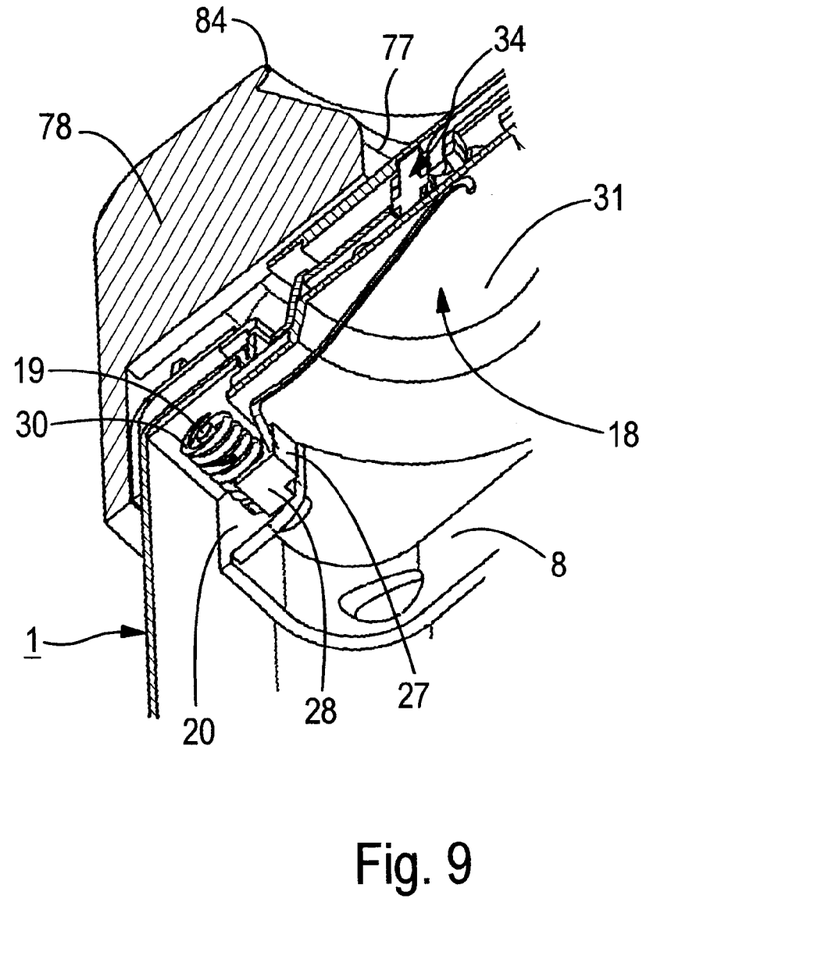
FIG. 9 a partial sectional perspective view as in FIGS. 1–5 which shows the closure flap affixed to the intake fitting.

Beneath the opening rim 3, is located a closure flap 18 which is swingable about an axle 19 which runs at right angles to the center axis 10. The axle 19 is seated in projecting holding bearings 20, which are formed on the tube section 8 (FIG. 9).

The closure flap 18 is essentially a circular disk, which possesses an upwardly convex, central bulge 31, that serves as a carrier 22 for a locking mechanism 34, which will be described below in greater detail. The area, extending radially outward, borders contiguously on the bulged carrier 22 and runs in a plane parallel to an extended plane including the sealing edge 5 and carries a ring-shaped sealing element 23. The ring-shaped sealing element 23 is made of an elastomer based material. The ring-shaped sealing element 23 acts in the closed position of the closure flap 18 together with the sealing seat 5 in the context of a sealing pair and restricts or prevents the escape of fuel or fuel vapor from the intake fitting 1.

On the rim of the closure flap 18 are two webs 24, formed tangentially, having their outer sides remote from one another with each of which, respectively, a holding latch 25 is integrated in a one piece construction. The holding latch 25 is penetrated by a slot 26 extending in an axial direction. The webs 24 exhibit a first section 27. This section 27 is formed on the closure flap edge. From the edge, the first section 27 extends downward parallel to the central axis 10a of the closure flap 18. The webs 24 also possess a connected, somewhat radial running second section 28. These sections form together, with the holding latches 25, a receptacle for the wound, central section 29 of a lever spring 30. The spring lever portion 32 abuts against the underside of the bulged carrier 22 and the other lever 33 against the inner wall of the intake fitting 1.

For the locking of the closure flap 18, on the upper side of the carrier 22, a locking mechanism 34 is located. This comprises two bearing plates 35, 36 set at an axial distance, one from the other; two essentially flat, bar-shaped pivoting arms 38, 39 and one pivoting axis 39 as well as a bar spring 40. The edge of the upper bearing plate 35, when seen in assembled condition, is molded in an apron 42 which enlarges conically toward its free end. The free end then extends itself radially outwardly to form a flange 43. The side wall of the carrier 22 is likewise designed to be of tapered shape, whereby, at the least, the inclination of the outer side of the wall 44 corresponds to the inclination of the inner side of the apron 42, so that the apron 42 can be placed on the upper section of the carrier 22, and in that position, for example, with the aid of welding, can be securely affixed.

From the outside of the side wall 44, an annular ring 51 projects, upon which the flange 43 supports itself with its underside. The flange 43 possesses a small axial distance to the ring-shaped sealing element 23 and extends itself over this completely in a radial direction. The ring-shaped sealing element 23 is affixed in position by the flange 43 on the closure flap 18.

The pivoting arms 38, 38a pivot in one plane, which is parallel to and with an axial spacing from the extended plane emanating from the seat 5 of the sealing element. The inner ends 45, proximal to one another, of the pivoting arms 38, 38a, possess, as seen in an axial direction, a lesser thickness and overlap each other (see FIG. 6). The overlapping ends 45 are penetrated by the pivoting axle 39. In the upper bearing plate 35 is located a first guide groove 46 radially extending away from the center and opening to the outside (FIGS. 2, 3) into which the pivoting axle 39 engages itself with a guide pin 47 protruding from the overlap area of the pivoting arms 38, 38a. A second guide groove 48 totally penetrates the lower bearing plate 36. The pivot axle 39 is slidingly located therein by means of a radially extending guide section 49. The upper side 50 of the guide section 49 serves as a support for the inner ends 45 of the pivoting arms 38, 38a. The pivoting arms 38, 38a are so dimensioned in the axial direction, that between their underside and the lower bearing plate 36, a spaced distance 52 is maintained. Thus, the pivoting arms 38 do not load the lower bearing plate 36 by their pivoting motion. With the locking mechanism upper inner surface 41a of the upper bearing plate 35, however, they do stand in contact, whereby the axial force exercised by the lever spring 30 is transmitted to the closure flap 18 to urge the closure flap 18 closed.

For the activation of the pivoting arms 38, 38*a*, an activation rod 53 is provided, which is conducted into the first guide groove 46. This activation rod 53 engages the two hooks 55, 55*a*, which are located on the inner ends 45, 45*a*, respectively, of the pivoting arms 38, 38*a*. This is accomplished by the end section 54 of the activation rod 53, which is bent downward to form a hook-like curvature. In the locked condition, in which the pivoting arms 38, 38*a* are somewhat aligned (FIG. 6), the hooks 55, 55*a* overlap one another in an axial and radial direction. In this position, the pivoting arms 38, 38*a*, respectively, penetrate into windows 56, 56*a* that cut through the apron 42.

In the bearing plates 35, 36, besides the guide grooves 46, 48, two control grooves 57, 57*a* are also present, whereby the lower bearing plate 36 is penetrated by the control grooves 57. The control grooves 57, 57*a* form an obtuse angle, a, opening toward the central axis 10*a*, this angle a having a value of about 120°. The control grooves 57, 57*a*, respectively, engage control pins 58, 58*a* that protrude from upper/lower side of the pivoting arms 38, 38*a* in an axial direction.

Figure 2:
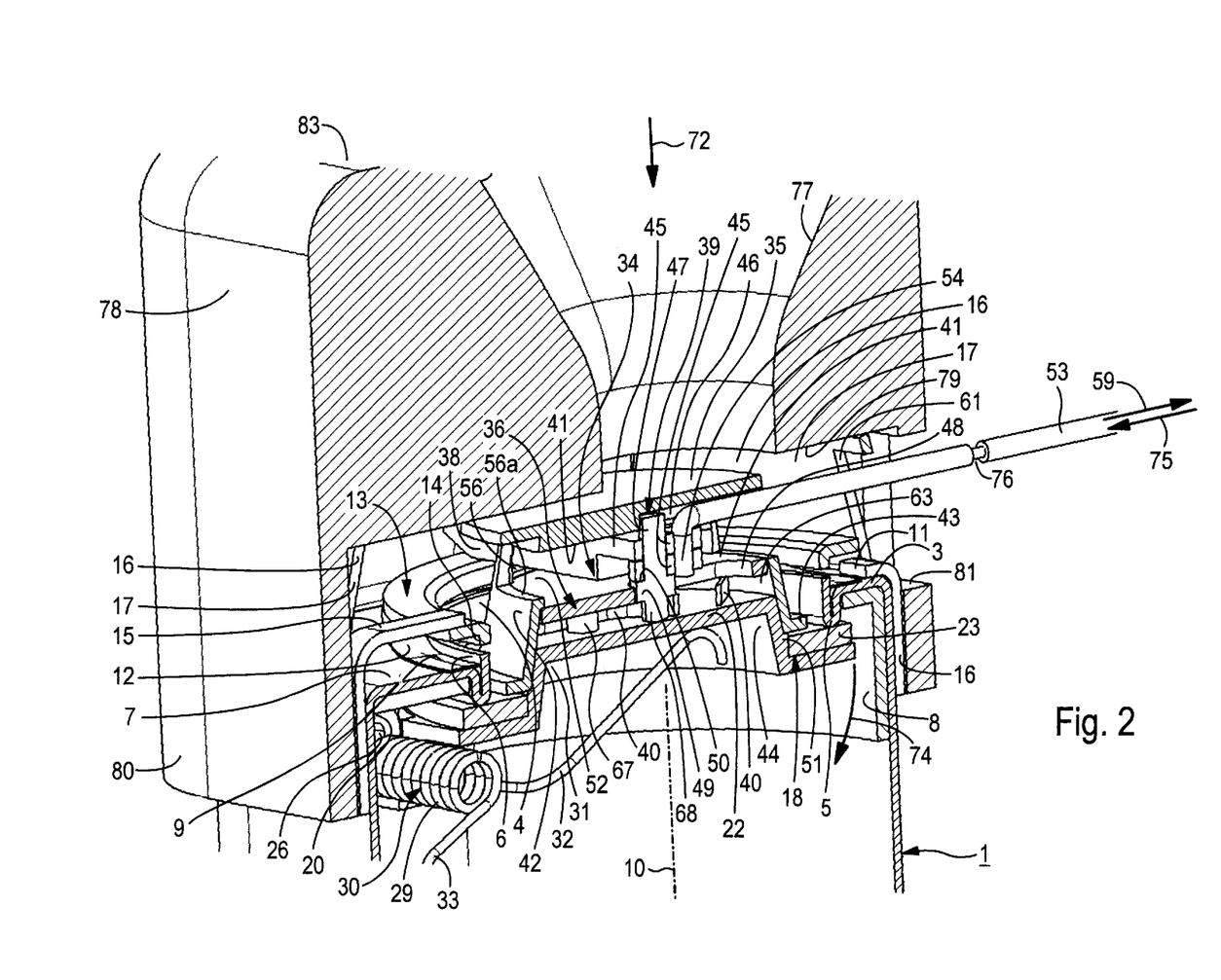
FIG. 2 an enlarged perspective sectional view from FIG. 1, which shows an intake fitting with a locked closure flap.
Figure 3:
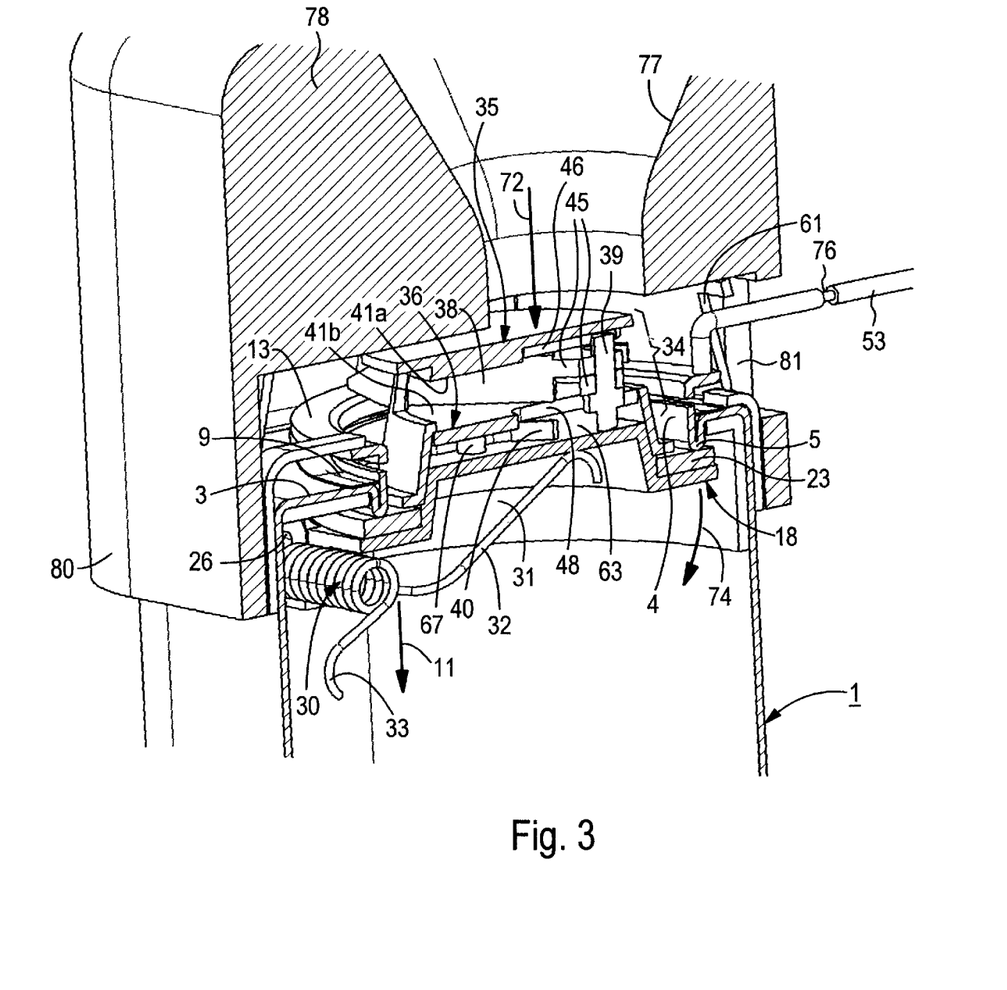
FIG. 3 an illustration corresponding to FIG. 2 showing the closure flap unlocked.
Figure 4:
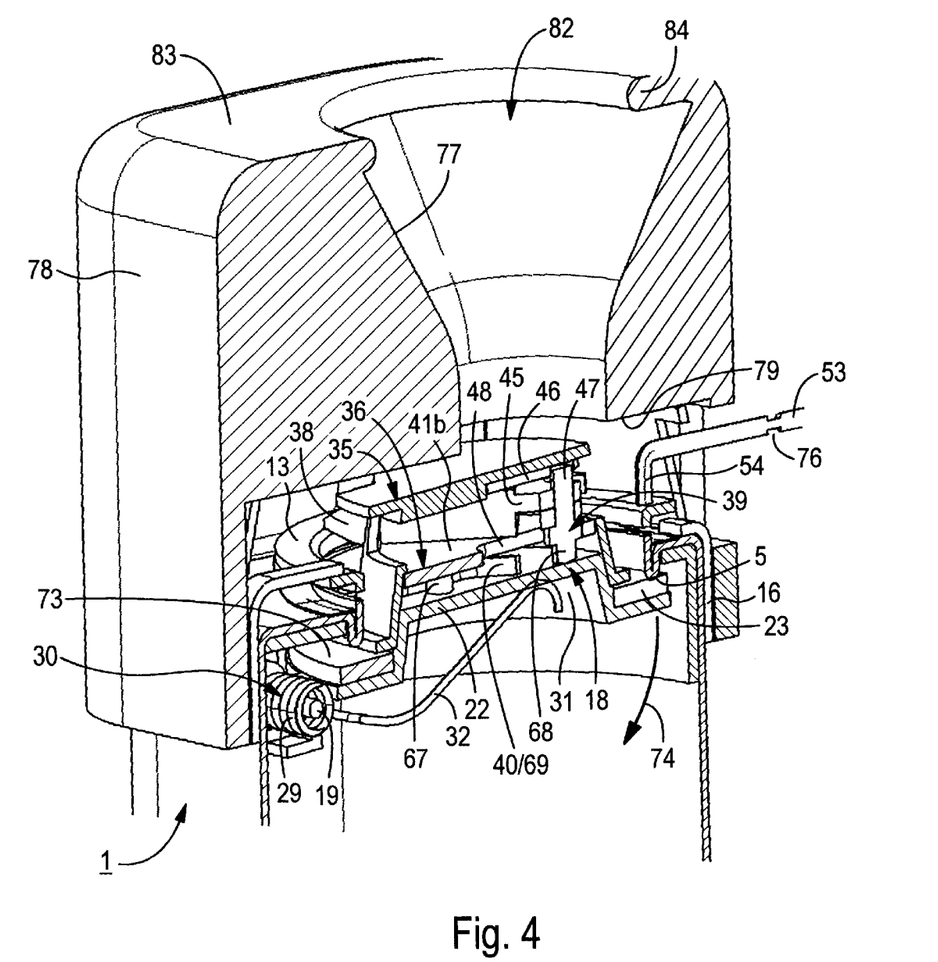
FIG. 4 an illustration corresponding to FIG. 3, in which the closure flap on the side that is pivotably held is set back in an axial direction from the sealing seat.
Figure 5:
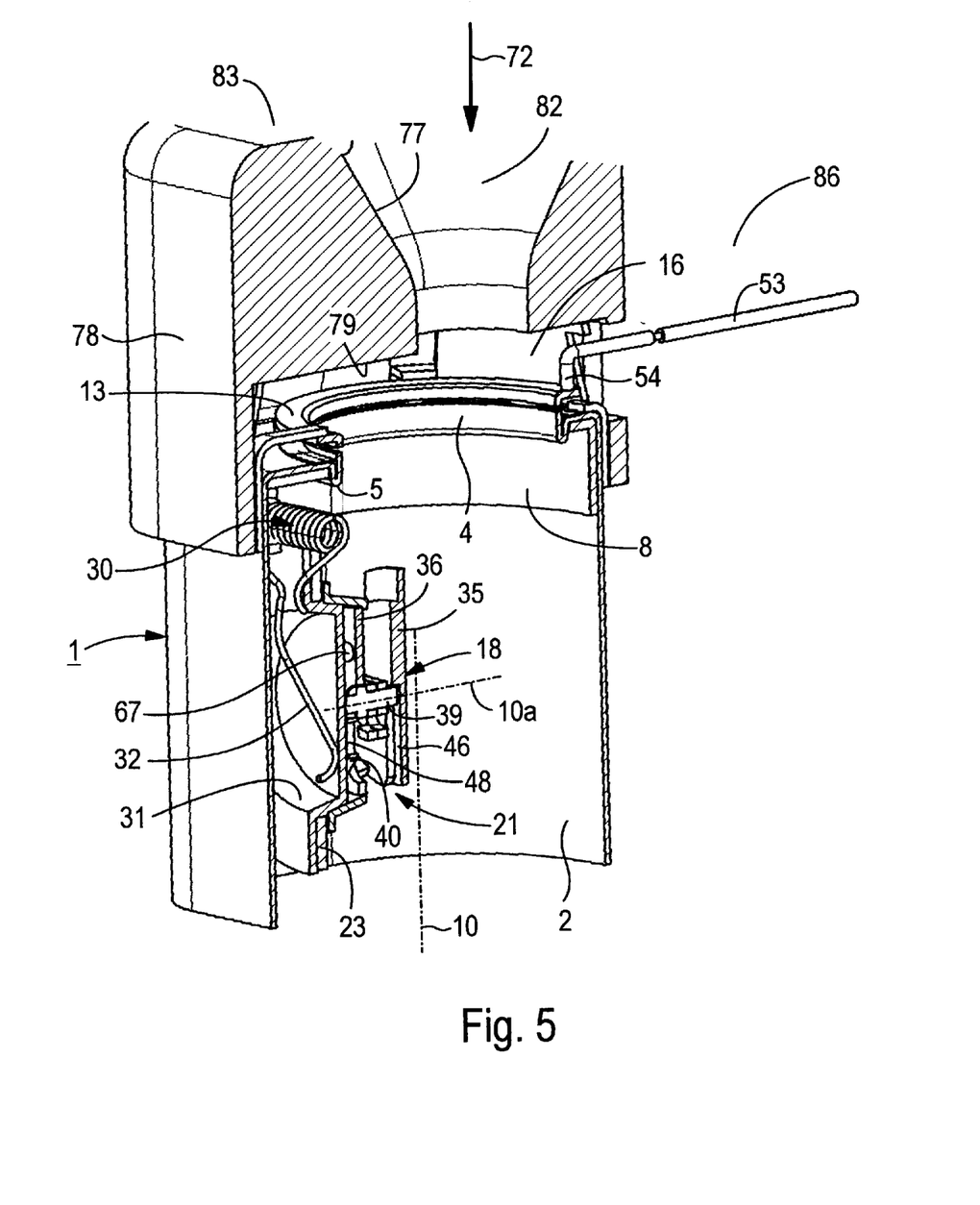
FIG. 5 an illustration in accord with FIG. 3 showing the closure flap fully open.
Figure 6:
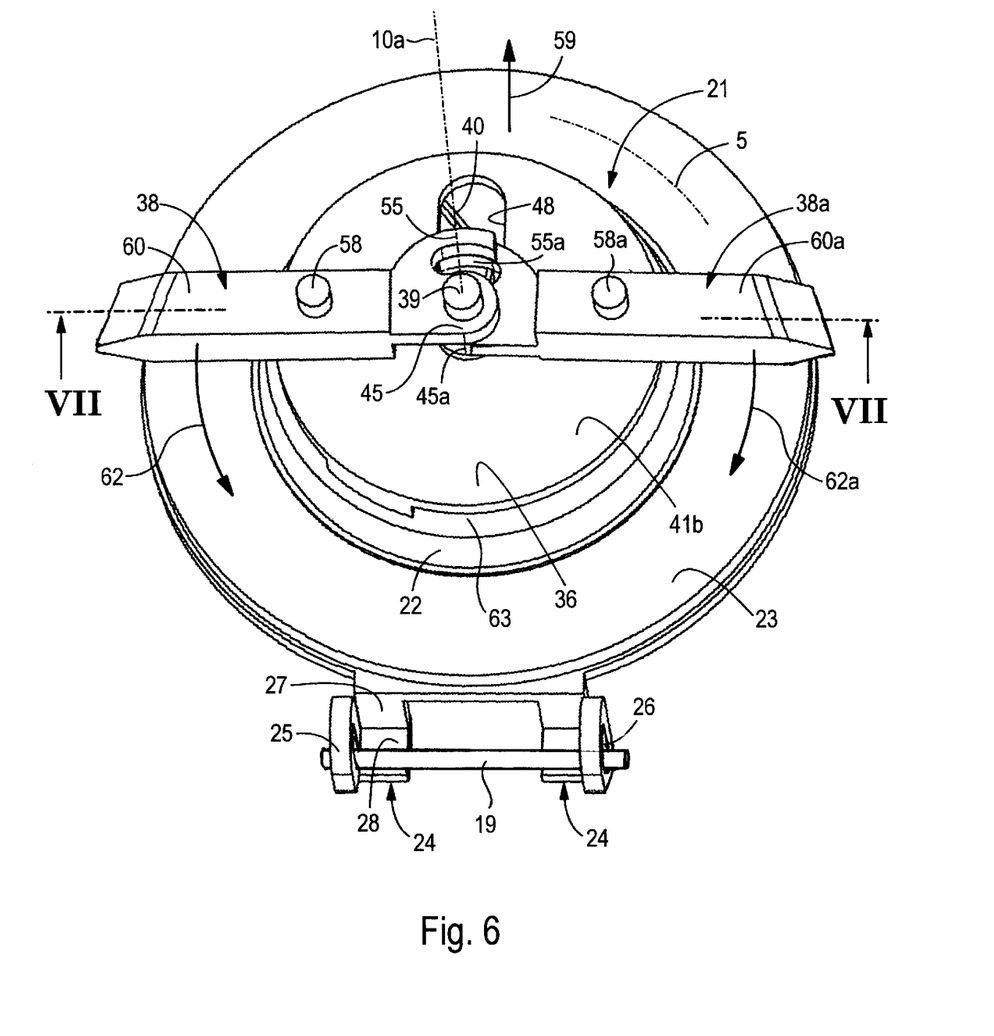
FIG. 6 a perspective view of a closure flap with two pivot arms also showing the opening rim zone of the intake fitting opening which coacts with the two pivot arms.

If in the situation in FIGS. 2 and 6, the activation rod 53, which is passing through the single sheath opening 61 in the protective sheath 16 in the direction of the exiting arrow 59, should move radially toward the outside, then the pivot axle 39 and the inner ends 45, 45*a* of the pivoting arms 38, 38*a* would also move in the same direction. By the co-action of control pins 58 and control grooves 57, the locking ends 60, 60*a* are moved in the direction of the pivot arrows 62, 62*a*, respectively. At the end of this pivoting movement, the locking ends 60 are so far placed radially inward, that they are out of engagement with the slider ring 13. The closure flap 18 can then be opened to the inside against the force of the lever spring 30 with the aid of an intruding fuel hose nozzle. In order to enable an opening of the closure flap 18 in the released state of the pivoting arms 38, 38*a*, it is necessary that the activation rod be separated from the hooks 55, 55*a* of the pivoting arms. This is achieved in that the hooks 55, 55*a* exhibit a length of such nature that, in the released position of the pivoting arms 38, 38*a*, they no longer overlap one another. In this case, their free ends are so far distanced, one from the other, that they find themselves outside of the movement path of the hook-end section 54 of the activation rod 53. These can now be separated from the pivoting arms 38, 38*a*, and be moved so far to the outside that they find themselves lying in a position which is outside of the swinging zone of the closure flap.

So that during the opening and the closing movement the pivoting arms 38, 38*a* remain in their released position, an arresting means of the pivot axle 39 in its end bearings is provided. For this purpose, between the lower bearing plate 36 and the carrier 22, there is allowed an intervening space 63, in which the above mentioned bar spring 40 is placed.

Figure 7:
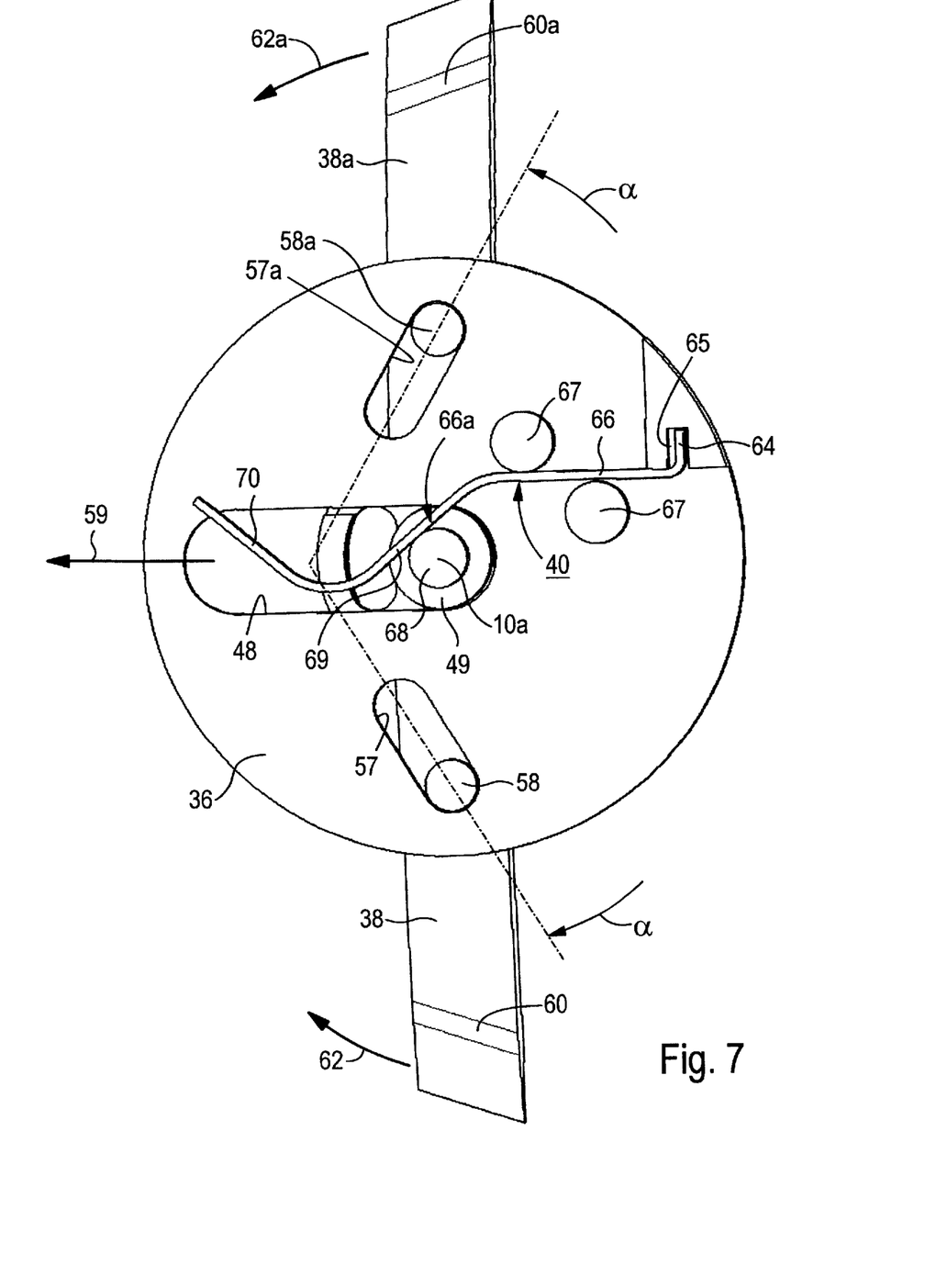
FIG. 7 a view of the underside of the locking apparatus taken along line VII—VII in FIG. 6.

The bar spring 40 does not extend itself essentially in the direction of second guide groove 48 and possesses a first, substantially straight, longitudinal section 66 which, with a curved about end 64 engages in a spring recess 65 on the under side of the bearing plate 36. The first longitudinal section 66 (FIG. 7) is fixed in a transverse direction by two projecting bearing pins 67. On the first longitudinal section 66, a second, somewhat wide V-shaped continuation appears, designated second longitudinal section 66*a*. This section enters into the movement path of a pin 68 which is on the guide section 49 of the under side of the pivot axle 39. In the locked position shown in FIG. 7, the pin 68 acts in common with a third longitudinal section 69, which is a continuation of first longitudinal section 66 and second longitudinal section 66*a*. Accordingly, pin 68 and third longitudinal section 69 in the released position, with the section continuation 70, effect a bearing-end arrest.

Figure 1:
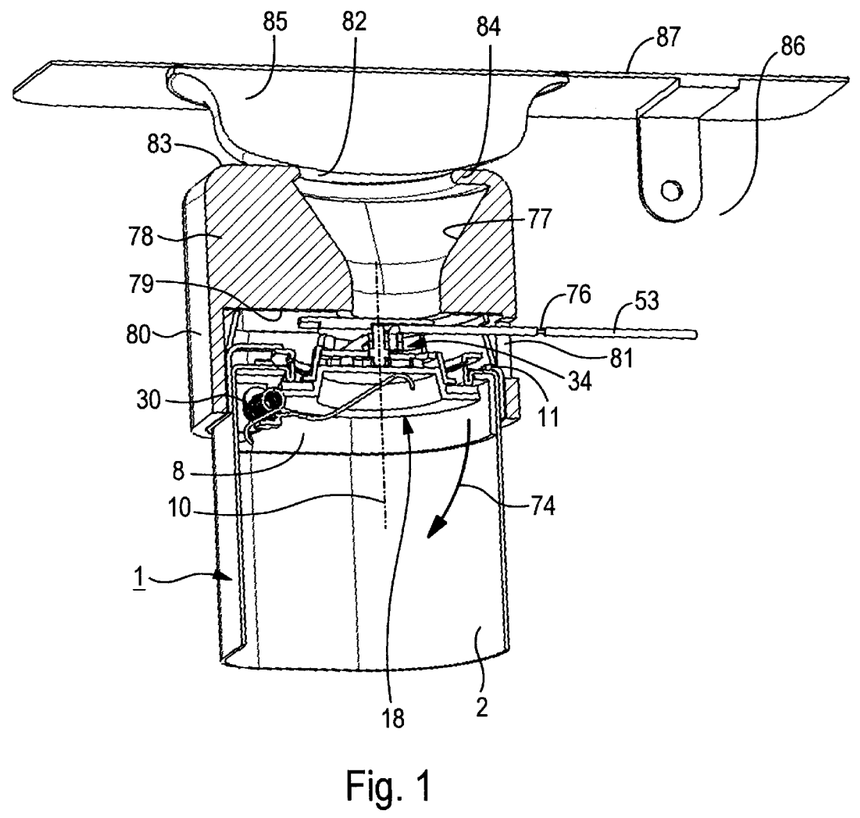
FIG. 1 a perspective longitudinal and sectional presentation of a first embodiment, which shows an intake fitting with a superimposed entry funnel, whereby the entry funnel is closed by a sealing element affixed to a closure flap.

In the situation shown in FIGS. 1 and 2, the closure flap 18 is pressed against the sealing seat 5 by means of the lever 32 of the lever spring 30 with its sealing element 23 which consists of an elastomeric material. It could just as well be considered that the sealing element seat 5 be placed on the closure flap and a sealing element 23 on the opening rim 3 of the intake fitting 1. If the closure flap 18 is pushed in the direction of intake arrow 72 by the force of a fuel hose nozzle penetration, the flap moves first on its pivot bearing side by an offset in a forced movement through the slot 26 in the holding catches 25 in the axial direction 11. While on the opposite side of the pivot axle 19, the closure flap 18 is pressed by the lever spring 32 against the sealing seat 5. On the bearing side between sealing seat 5 and sealing element 23, an axial space 73 is available. Only when the pivot axle 19 finds itself in its lower end bearing in the slot 26, will the closure flap 18 be swung down in the direction of the flap arrow 74. If, after the end of the tank filling process, the fuel hose nozzle is withdrawn from the intake fitting 4, the closure flap 18 will move itself into the position which is presented in FIG. 4, in which on the bearing side, between the sealing element 23 and the sealing seat 5, an axial space is present. Only when the activation rod 53 is moved radially inward in the entering arrow 75 direction and thereby, the pivoting arms 38, 38*a* are moved into their locked position, would it be possible, by means of the co-action of the slider ring 13 and the locking ends 60 of the pivoting arms 38, 38*a*, that the sealing element 23 is completely pressed against the sealing element seat 5. The force of the pressure arises from the combination of the force of the lever spring 32 on the carrier 22 and the force from the annular spring 9 which is exercised through the slider ring 13 onto the pivoting arms 38, 38*a*.

The already mentioned protective sheath 16 encompasses within itself the locking mechanism of the closure flap 18, whereby the danger of unlocking is diminished in the case of an accident-caused deformation of the vehicle body, particularly in the area of the intake fitting. The same purpose is aided by a break-away point 76 in the activation rod 53. If the activation rod 53 is separated at this point, the above described arrest action 39 of the pivot axle, that is of the pivoting arms 38, 38*a*, prevents unwanted unlocking of the closure flap 18.

In order to ease the insertion of the fuel hose nozzle, a top piece 78 is installed on the intake fitting 1. The top piece 78 possesses a top piece inner surface 79, which supports itself on the exposed side of the protective sheath 16. The top piece inner surface 79 possesses an extended plane, parallel to the plane of pivoting, running between the sealing seat 5 and the tapering section of the intake funnel. From the outer rim of the inner surface 79, a tube-like top piece longitudinal section 80 extends itself downward. With this top piece longitudinal section 80, the top piece 78 is slipped on to the intake fitting, and there made fast. For the purpose of the activation rod 53, a rod recess 81 is provided in the top piece 78. The intake funnel 77 opens with an insertion opening 82 (FIG. 1) in the upper side 83 of the top piece 78. In this insertion opening 82, there extends a radial flange 84 designed to serve the self retention of a fuel hose nozzle (not shown) therein, whereby the outer side of this aligns with the upper surface 83 of the top piece 78. The insertion opening 82 can be closed with a tank sealing element 85, which is located on the inside of a tank overhang 87 which encloses the intake fitting 1 and closes off the tank recess 86.

The sealing element 85, which advantageously is made from an elastomeric material, prevents contamination from entering the intake funnel 77 where it could continue on into the tank. The intake funnel 77 is positioned in the top piece 78 to protect parts, e.g., the activation rod 53 and the apparatus 88, from damage from insertion of a fuel hose nozzle. Apparatus 88 is underneath the top piece inner surface 79 of the top piece 78.

Figure 8:
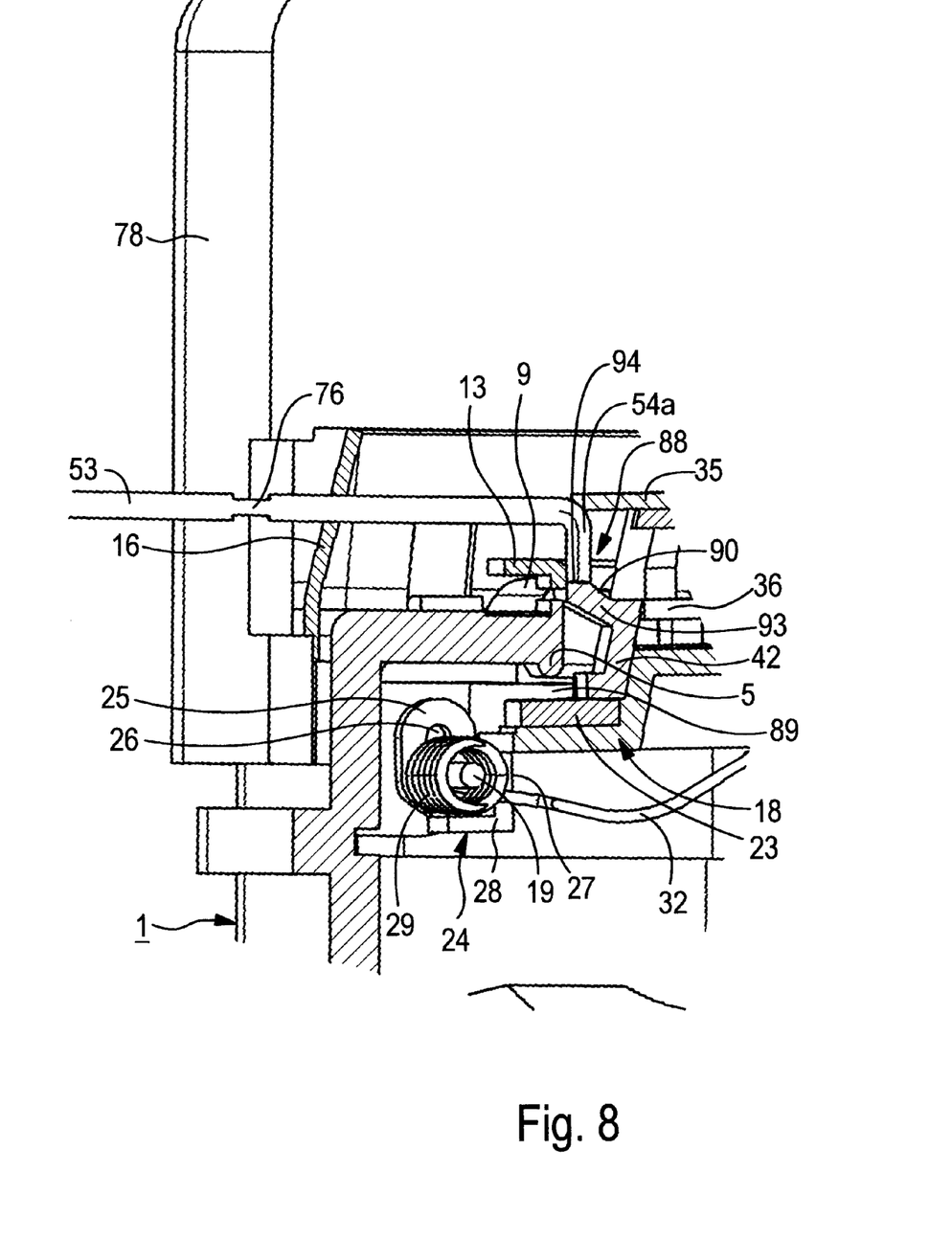
FIG. 8 a partial sectional view of a second embodiment in which an apparatus is provided with the closure flap, during a tank purging, movable to an interposed position.

In the embodiment illustrated in FIG. 8, apparatus 88 is presented wherein the closure flap 18 is made movable in an interposed position in a space between the sealing element 23 and the sealing element seat 5. This interposed position is shown in FIG. 8. The apparatus 88 comprises an upwardly extending, sloped piece 93 which is integral with the apron 42. The sloped piece 93 possesses on its upper side, an inclined surface 90. Further, the apparatus 88 includes a counteracting element 54a to the inclined surface 90 which coacts therewith in the concept of a wedge. The counteracting element 54a is formed by the end section 54a of the activation rod 53a.

Although in the FIGS. 1–5, the illustrated intake fitting 1 is shown with the activation rod 53 on that side remote from the pivoting axle 19, in the case of the intake fitting 1 according to FIG. 8, the activation rod 53a is depicted on the side of the pivot axle 19. That is, activation rod 53a extends itself from this side radially inward from the outside. The sloped piece 93, however, can also be installed on the opposite side, whereby it can then be activated by the activation rod 53 from that corresponding side.

As shown in FIG. 8, in the interposed position of the closure flap 18, the end section 54a lies with its front part against a detent surface 94, which connects itself to the sloped piece 93 from a radially outward position. The closure flap 18, by this means, is fixed in its interposed position. If the closure flap is unlocked, as was described above, then the activation rod 53a moves radially to the outside and in turn moves the pivot arms 38, 39 (not shown in FIG. 8) into their released position. As this is done, the end section 54a of activation rod 53a runs up on the inclined surface 90 of the sloped piece 93, whereby the pivot axle 19 moves in the slot 26 axially downward, and an annular opening 89 between the sealing element 23 and the sealing seat 5 is created. In this way, an internal tank pressure is relieved, which loaded the closure flap 18 in the direction of its closing position and hindered its opening.

The interposed position of the closure flap 18 has another function. When, at the termination of the tank-filling process, the fuel hose nozzle is withdrawn from the intake fitting 1, the closure flap moves first into its interposed position. Drainage from the fuel hose nozzle can then flow into the tank. A final closure of the intake fitting is effected only when a signal is released affirming the locking of the closure flap 18, that is, when the signal is initiated by the activation of a switch (not shown) in the interior of the vehicle.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A fuel intake assembly for a vehicle fuel tank, the assembly comprising:
   a fitting defining a passageway in communication with the fuel tank and an opening spanning the passageway;
   a closure flap pivotally mounted to the fitting so as to pivot between a closed position closing the opening and an open position opening the opening, the closure flap having a first side facing the passageway and a second side facing and in communication with an exterior of the vehicle;
   a spring urging the closure flap toward the closed position;
   a sealing element disposed on one of the closure flap or the fitting;
   a seat disposed on the other of the closure flap or the fitting proximate the opening configured to sealingly engage the sealing element; and
   a locking mechanism attached to the second side of the closure flap configured to releasably lock the closure flap in the closed position, the locking mechanism having a locking element movably disposed on the closure flap between a locked position and a released position.

2. The fuel intake assembly of claim 1, further including a spring element for urging the locking element toward the locking position, an opening rim disposed circumferentially about the opening of the fitting, and the spring element being an annular spring circumferentially disposed about the opening rim and compressible in an axial direction.

3. The fuel intake assembly of claim 1, wherein the locking mechanism has a detent element cooperating with the locking element in the locked position such that the closure flap is axially releasably locked, and wherein a center of the closure flap is axially aligned with a center axis of the fitting.

4. The fuel intake assembly of claim 1, further comprising an axially movable ring proximate the opening rim substantially parallel to and at an axial distance from the seat, the ring movably lockable by the locking element.

5. The fuel intake assembly of claim 1, wherein the locking mechanism has at least two locking elements, the at least two locking elements configured to pivot in a plane substantially parallel to and at an axial distance from the seat, the at least two locking elements having locking ends, the locking ends configured to lockingly extend over an opening rim in substantially diametrically opposite locations.

6. The fuel intake assembly of claim 5, wherein the at least two locking elements have inner ends, the inner ends overlapping one another and penetrated by a common pivoting axle substantially in the center of the closure flap.

7. The fuel intake assembly of claim 6, wherein the at least two locking elements are pivoting arms.

8. The fuel intake assembly of claim 7, wherein the pivoting axle is axially movable and coupled in the pivoting arms, the pivoting axle configured to move in response to the pivoting arms moving in the plane.

9. The fuel intake assembly of claim 8, further comprising a bearing plate, the bearing plate substantially parallel to the pivoting plane of the pivoting arms, the bearing plate having a guide groove and control groove.

10. The fuel intake assembly of claim 9, further comprising an apron disposed circumferentially about the bearing plate and encompassing the pivoting arms.

11. The fuel intake assembly of claim 8, further comprising at least two bearing plates, the at least two bearing plates spaced apart and parallel to each other, the at least two bearing plates substantially parallel to the pivoting plane of the pivoting arms, a respective one of the at least two bearing plates having a guide groove and at least two control grooves.

12. The fuel intake assembly of claim 11, wherein the at least two control grooves form an obtuse angle in the plane of the closure flap.

13. The fuel intake assembly of claim 12, further comprising at least two control rods, the at least two control rods guiding the pivoting arms in the at least two control grooves.

14. The fuel intake assembly of claim 10, wherein the apron has a window, the window opening from proximate the intake opening towards the pivoting axle.

15. The fuel intake assembly of claim 14, wherein the window is configured to be penetrated by a respective one of the pivoting arms in a locked position.

16. The fuel intake assembly of claim 14, wherein the apron has at least two windows disposed substantially diametrically opposite each other, the at least two windows opening from proximate the intake opening towards the pivoting axle.

17. A The fuel intake assembly of claim 9, wherein the guide groove penetrates the bearing plate, the bearing plate and the closure flap being spaced apart.

18. The fuel intake assembly of claim 8, wherein the pivoting axle has a stop device disposed adjacent the pivot axle.

19. The fuel intake assembly of claim 18, wherein the stop device is a bar spring, the bar spring extending substantially in the direction of the guide groove, the bar spring having a V-shaped longitudinal section configured to engage laterally against the pivoting axle in the closed position in a movement zone of the guide groove.

20. The fuel intake assembly of claim 7, wherein the pivoting arms each have opposed hooks, the hooks rotatable adjacent each other at a pivoting arm inner end, the hooks overlappable with one another in an axial and a radial direction.

21. The fuel intake assembly of claim 20, wherein the hooks are engageable by a hook-shaped section of a radially extending activation rod.

22. The fuel intake assembly of claim 21, wherein the hooks are located outside of a motion path of the hook-shaped section, the hooks configured to not overlap in the released position.

23. The fuel intake assembly of claim 21, wherein the activation rod has a break-away section.

24. The fuel intake assembly of claim 1, further comprising a protective sheath affixed about the fitting.

25. The fuel intake assembly of claim 24, wherein the protective sheath is a tube-shaped metal sheath.

26. The fuel intake assembly of claim 1, further comprising an intake funnel affixed to the fitting and in selective communication with the atmosphere.

27. The fuel intake assembly of claim 26, further comprising a sealing element configured to close the intake funnel, the sealing element disposed adjacent an inner side of a tank cover.

28. A fuel intake assembly for a vehicle fuel tank having a fitting defining a passageway in communication with the fuel tank and an opening spanning the passageway, the assembly comprising:

a closure flap configured to pivot between a closed position closing the opening and an open position opening the opening, the closure flap further configured for an interposed position such that the fuel tank pressure is relieved prior to opening the opening;

a spring urging the closure flap toward the closed position;

a sealing element disposed on the closure flap;

a seat disposed on the fuel intake fitting to sealingly engage the sealing element; and an apparatus attached to the closure flap configured to releasably lock the closure flap in the closed position and configured to locate the closure flap in an interposed position, the apparatus having a counteracting element and a sloped element cooperating to locate the closure flap such that tank pressure is relieved before opening the opening.

29. The fuel intake assembly of claim 28, wherein the counteracting element is a hook-shaped end section of a radially extended actuation rod.

30. The fuel intake assembly of claim 28, wherein the sloped element is an inclined surface formed on the closure flap.

31. The fuel intake assembly of claim 28, further comprising a final closure switch in communication with the fitting, the final closure switch configured to effect final closure of the closure flap after the closure flap is in the interposed position.

* * * * *